US011700567B2

(12) United States Patent
Schafer et al.

(10) Patent No.: US 11,700,567 B2
(45) Date of Patent: Jul. 11, 2023

(54) WAVEGUIDE SYSTEM WITH REDUNDANCY

(71) Applicant: Raytheon Technologies Corporation, Farmington, CT (US)

(72) Inventors: Bradley C. Schafer, Ellington, CT (US); Coy Bruce Wood, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 309 days.

(21) Appl. No.: 17/071,321

(22) Filed: Oct. 15, 2020

(65) Prior Publication Data

US 2022/0124596 A1 Apr. 21, 2022

(51) Int. Cl.
*H04W 40/04* (2009.01)
*H04L 12/42* (2006.01)

(52) U.S. Cl.
CPC ............. *H04W 40/04* (2013.01); *H04L 12/42* (2013.01)

(58) Field of Classification Search
None
See application file for complete search history.

(56) References Cited

U.S. PATENT DOCUMENTS

| 6,104,853 A | 8/2000 | Miyagi et al. |
| 7,486,864 B2 | 2/2009 | Diatzikis |
| 2009/0116502 A1* | 5/2009 | Hall ...................... G06F 11/182 370/406 |
| 2010/0309776 A1* | 12/2010 | Alharbi .................. H04L 47/10 370/216 |
| 2015/0013440 A1 | 1/2015 | Bianucci et al. |
| 2017/0058693 A1 | 3/2017 | Epstein |
| 2021/0068199 A1* | 3/2021 | Hirano .................. B60W 50/04 |

FOREIGN PATENT DOCUMENTS

| EP | 3086194 A1 | 10/2016 |
| EP | 3296635 A1 | 3/2018 |

OTHER PUBLICATIONS

European Search Report for European Application No. 21203017.5; Application Filing Date: Oct. 15, 2021; Date of Notification: Mar. 18, 2022, 8 pages.

* cited by examiner

*Primary Examiner* — Brian S Roberts
(74) *Attorney, Agent, or Firm* — Cantor Colburn LLP

(57) ABSTRACT

A system of a machine includes a first node and a second node configured to establish a first communication path through a waveguide system to guide a radio frequency transmission between the first node and the second node in the machine. The system also includes a third node and a fourth node configured to establish a second communication path in the machine. The first node is grouped with the third node as a first node group, and the second node is grouped with the fourth node as a second node group such that the second communication path provides a redundant communication path with respect to the first communication path for communication between the first node group and the second node group.

20 Claims, 7 Drawing Sheets

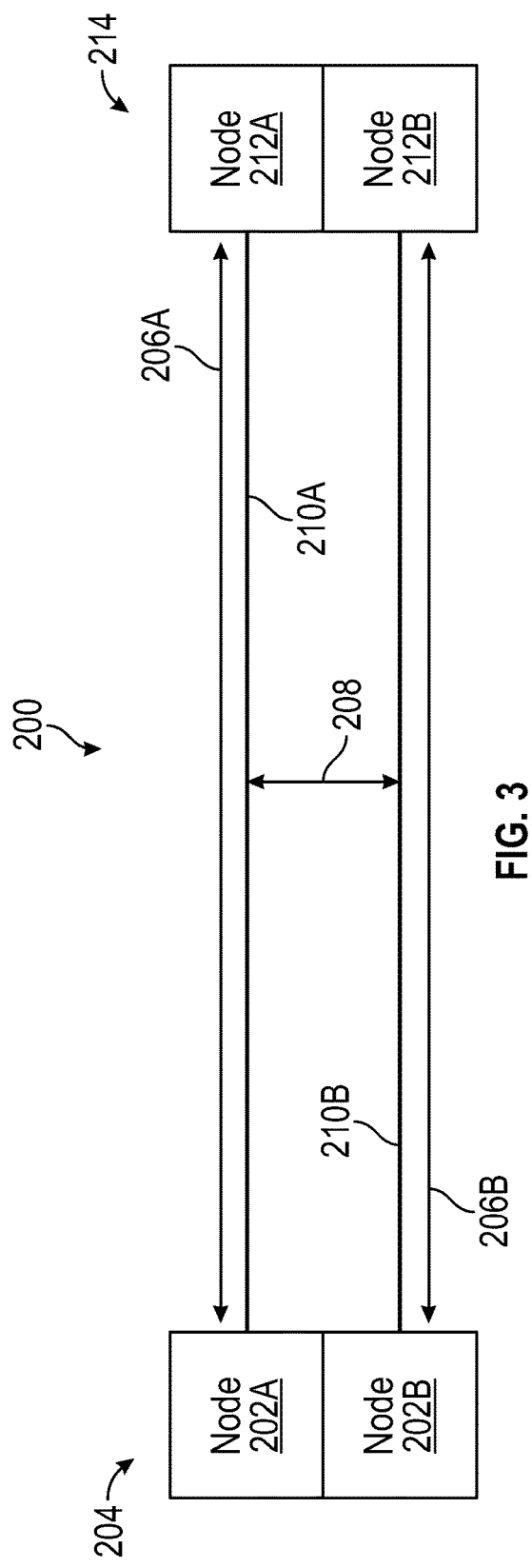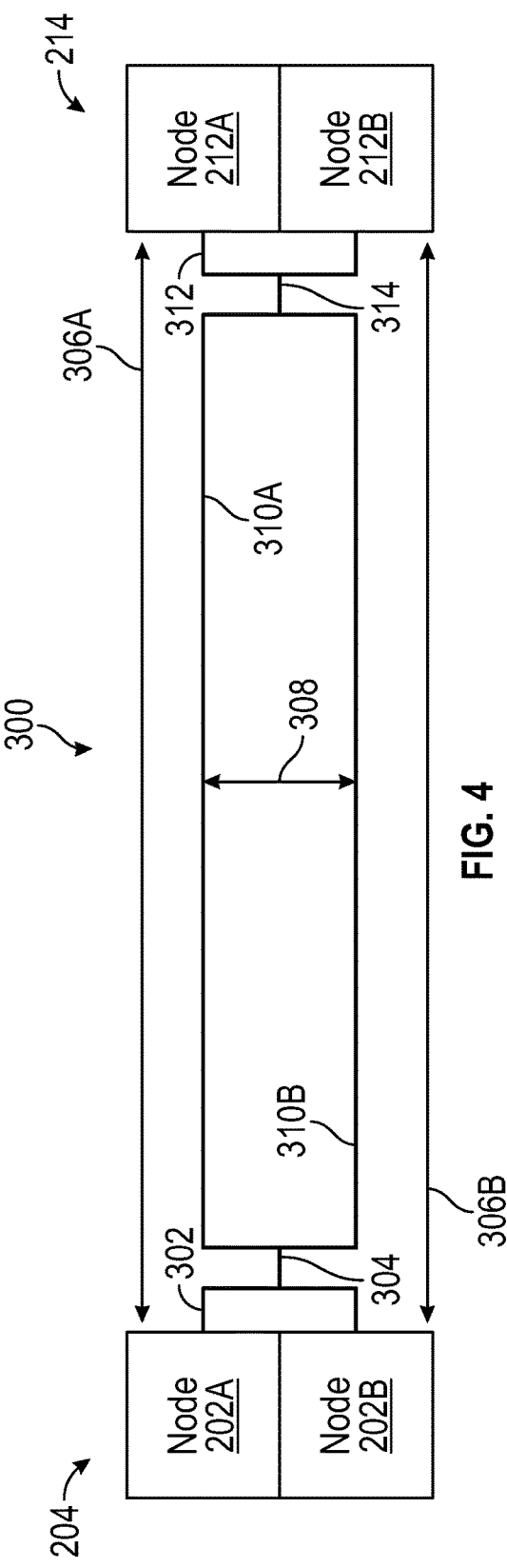

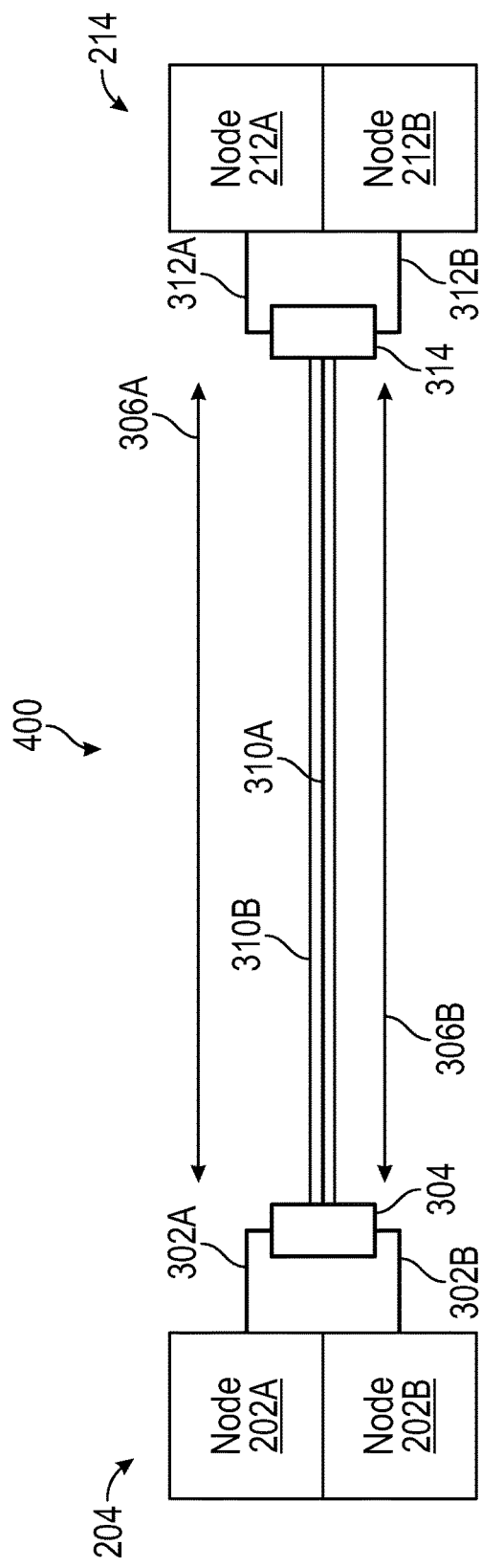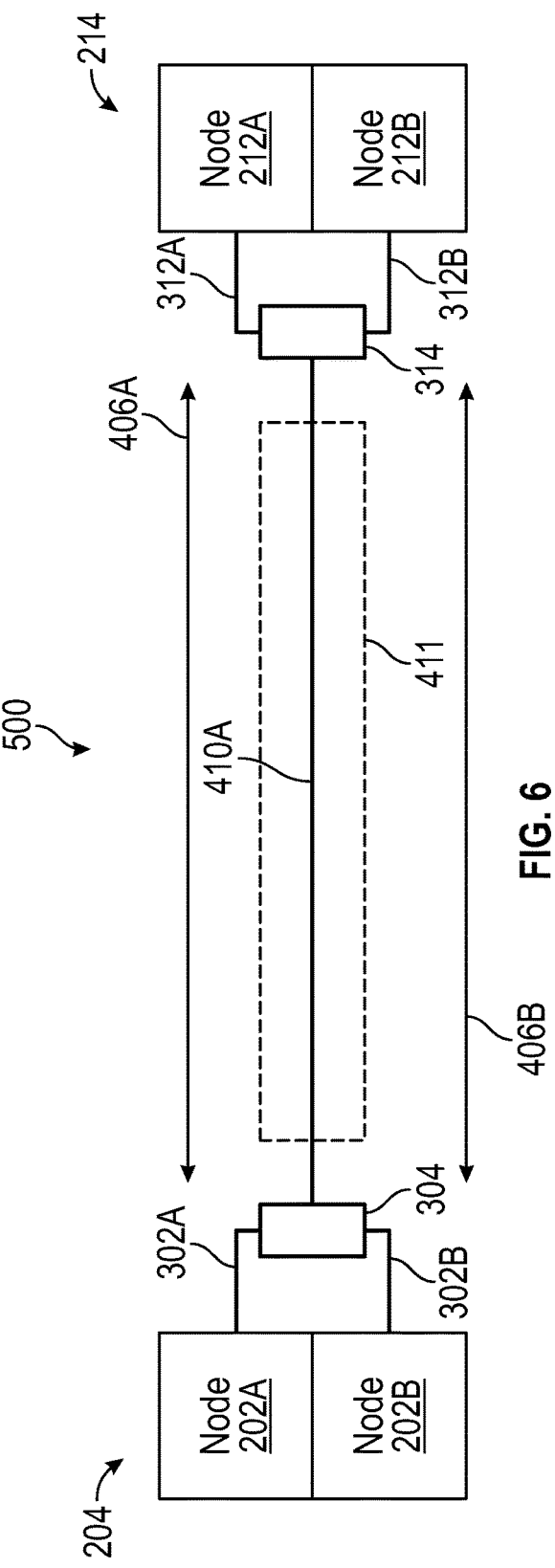
FIG. 5
FIG. 6

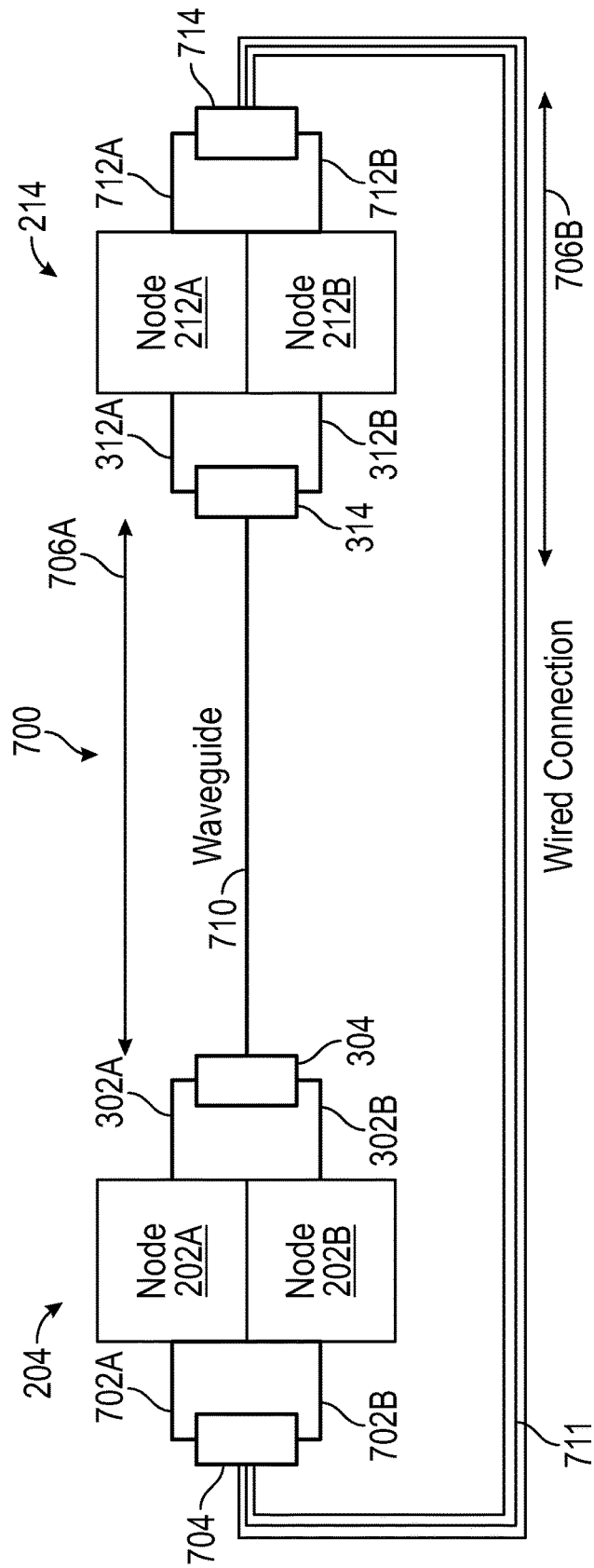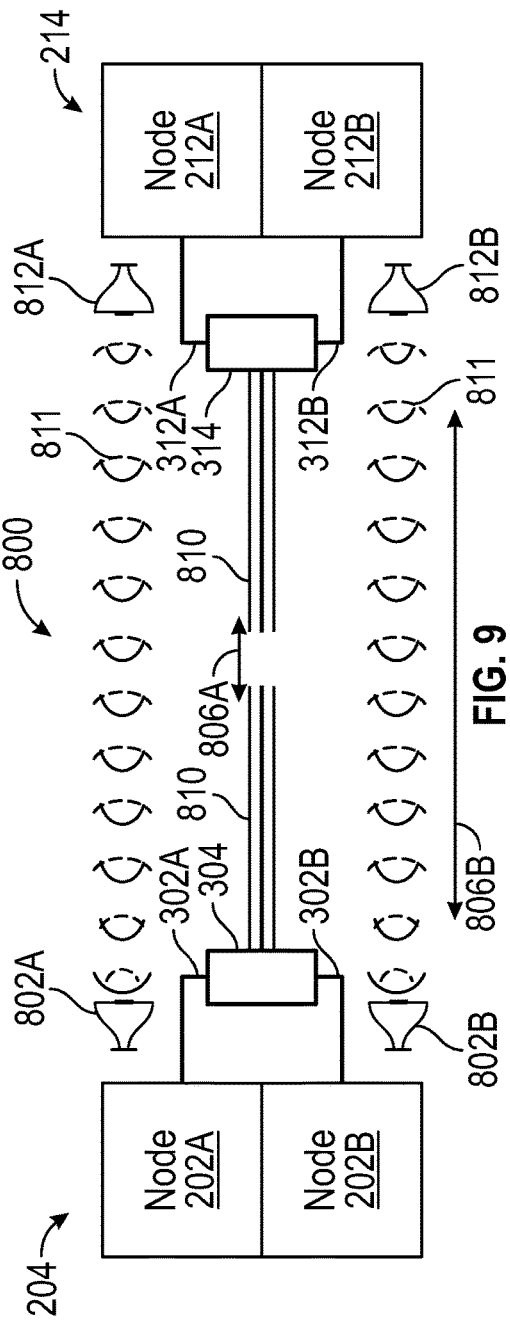

WAVEGUIDE SYSTEM WITH REDUNDANCY

BACKGROUND

This disclosure relates to electromagnetic communication, and more particularly to a waveguide system with redundancy.

As control and health monitoring systems become more complex, the interconnect count between system components increases, which also increases failure probabilities. With the increase in interconnects, large amounts of cabling may be used to connect sensors and actuators to controllers and/or diagnostic units of a machine. Long cable runs, including multiple wires, can add substantial weight and may increase susceptibility to noise effects and/or other forms of signal degradation. Increased wire connections can also result in a larger number of wire harnesses to remove and attach when servicing machine components. A larger number of wires and wire harnesses can increase the possibility of damage at pin/socket interconnects, particularly when the wire harnesses are attached and detached from components.

To achieve desired control and/or health monitoring, sensing systems may need information from locations that can be difficult to access due to moving parts, internal operating environment or machine configuration. The access limitations can make wire routing bulky, expensive, and potentially vulnerable to interconnect failures. Sensor and interconnect operating environments for desired sensor locations may exceed the capability of interconnect systems. In some cases, cable cost, volume, and weight may exceed desired limits for practical applications. Placement options and total number of sensors and actuators that may be installed in a machine can be limited by wiring and connector impacts on weight, reliability, physical sizing, and operating temperature limitations. Further, where power lines are routed in close proximity to communication lines, there can be a greater risk of crosstalk or noise transfer from the power lines to the communication lines. Such impacts may reduce signal-to-noise ratio and thereby reduce accuracy and/or reliability of data transmitted on the communication lines.

BRIEF DESCRIPTION

According to one embodiment, a system of a machine includes a first node and a second node configured to establish a first communication path through a waveguide system to guide a radio frequency transmission between the first node and the second node in the machine. The system also includes a third node and a fourth node configured to establish a second communication path in the machine. The first node is grouped with the third node as a first node group, and the second node is grouped with the fourth node as a second node group such that the second communication path provides a redundant communication path with respect to the first communication path for communication between the first node group and the second node group.

In addition to one or more of the features described above or below, or as an alternative, further embodiments may include where the first communication path includes a first waveguide, and the second communication path includes a second waveguide physically separated from the first waveguide.

In addition to one or more of the features described above or below, or as an alternative, further embodiments may include a shared communication path that merges at least one portion of the first communication path and the second communication path between the first node group and the second node group.

In addition to one or more of the features described above or below, or as an alternative, further embodiments may include where the waveguide system includes a debris shield of material configured to survive a ballistic impact.

In addition to one or more of the features described above or below, or as an alternative, further embodiments may include where the debris shield is integrally formed at least in part within a component of the machine.

In addition to one or more of the features described above or below, or as an alternative, further embodiments may include where the first communication path includes a first waveguide in a first ring topology connecting the first node group, the second node group, and one or more additional node groups, and the second communication path includes a second waveguide in a second ring topology connecting the first node group, the second node group, and the one or more additional node groups.

In addition to one or more of the features described above or below, or as an alternative, further embodiments may include where the second communication path includes a wired connection.

In addition to one or more of the features described above or below, or as an alternative, further embodiments may include where the second communication path comprises a wireless connection.

According to an embodiment, a system for a gas turbine engine includes a first node and a second node configured to establish a first communication path through a waveguide system to guide a radio frequency transmission between the first node and the second node of the gas turbine engine. The system also includes a third node and a fourth node configured to establish a second communication path in the gas turbine engine. The first node is grouped with the third node as a first node group, and the second node is grouped with the fourth node as a second node group such that the second communication path provides a redundant communication path with respect to the first communication path for communication between the first node group and the second node group associated with at least one sensor and/or actuator of the gas turbine engine.

In addition to one or more of the features described above or below, or as an alternative, further embodiments may include where the waveguide system includes a debris shield of material configured to survive a ballistic impact, and the debris shield is integrally formed at least in part within a component of the gas turbine engine.

In addition to one or more of the features described above or below, or as an alternative, further embodiments may include where the first communication path includes a first waveguide in a first ring topology connecting the first node group, the second node group, and one or more additional node groups of the gas turbine engine, and the second communication path includes a second waveguide in a second ring topology connecting the first node group, the second node group, and the one or more additional node groups of the gas turbine engine.

According to an embodiment, a method of providing redundancy for a waveguide system of a machine includes establishing a first communication path through the waveguide system configured to guide a radio frequency transmission between a first node and a second node in the machine. A second communication path is established between a third node and a fourth node in the machine. The first node is grouped with the third node as a first node group. The second node is grouped with the fourth node as a second node group, such that the second communication path provides a redundant communication path with respect to the first communication path for communication between the first node group and the second node group.

In addition to one or more of the features described above or below, or as an alternative, further embodiments may include establishing a shared communication path that merges at least one portion of the first communication path and the second communication path between the first node group and the second node group.

In addition to one or more of the features described above or below, or as an alternative, further embodiments may include where the waveguide system includes a debris shield of material configured to survive a ballistic impact, and integrally forming the debris shield at least in part within a component of the machine.

In addition to one or more of the features described above or below, or as an alternative, further embodiments may include connecting the first node group, the second node group, and one or more additional node groups in a first ring topology of the first communication path, and connecting the first node group, the second node group, and the one or more additional node groups in a second ring topology of the second communication path.

In addition to one or more of the features described above or below, or as an alternative, further embodiments may include where the second communication path includes a wired connection or a wireless connection.

A technical effect of the apparatus, systems and methods is achieved by a waveguide system with redundancy features in a machine as described herein.

BRIEF DESCRIPTION OF THE DRAWINGS

The following descriptions should not be considered limiting in any way. With reference to the accompanying drawings, like elements are numbered alike:

FIG. 3 is a schematic view of a waveguide system with redundant waveguides and redundant nodes in accordance with an embodiment of the disclosure;

FIG. 4 is a schematic view of a waveguide system with redundant waveguides, a shared communication path, and redundant nodes in accordance with an embodiment of the disclosure;

FIG. 5 is a schematic view of a waveguide system with a damage resistant waveguide and redundant nodes in accordance with an embodiment of the disclosure;

FIG. 6 is a schematic view of a waveguide system with a debris shield protecting a waveguide and redundant nodes in accordance with an embodiment of the disclosure;

FIG. 8 is a schematic view of a waveguide system with a redundant wired connection and redundant nodes in accordance with an embodiment of the disclosure;

FIG. 9 is a schematic view of a waveguide system with a redundant wireless connection and redundant nodes in accordance with an embodiment of the disclosure.

DETAILED DESCRIPTION

A detailed description of one or more embodiments of the disclosed apparatus and method are presented herein by way of exemplification and not limitation with reference to the Figures. As further described herein, redundant elements and paths are not limited to single redundancy but may be extended to multiple redundant elements and paths, such as a triplex configuration.

Figure 1:
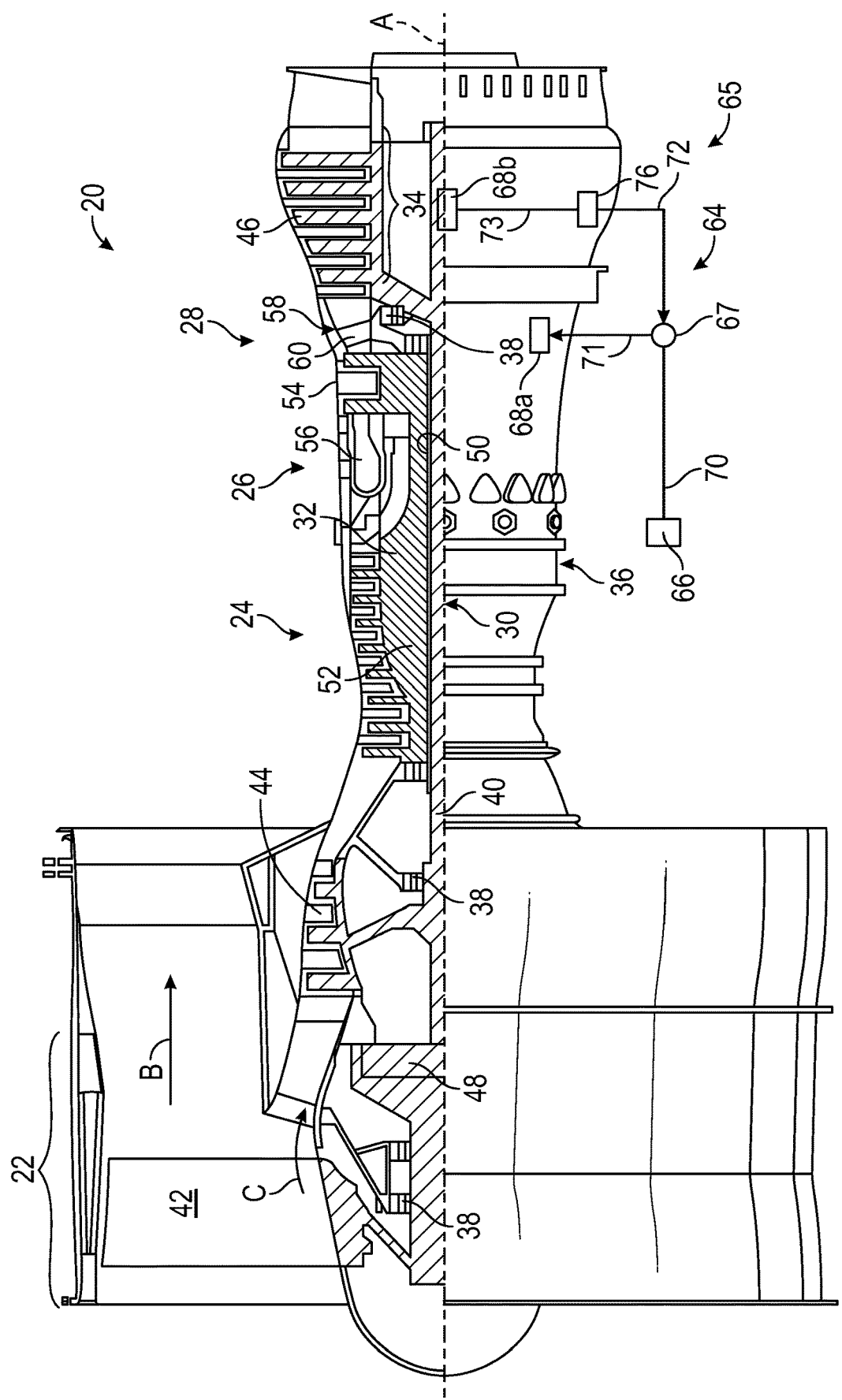
FIG. 1 is a cross-sectional view of a gas turbine engine as an example of a machine.

Various embodiments of the present disclosure are related to electromagnetic communication and power transfer through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The controller 66 may include various support interfaces and processing resources, such as input/output interfaces, processing systems, memory systems, communication interfaces, power management systems, and the like. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Prior control & diagnostic system architectures utilized in various applications include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use radio frequencies guided by the waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments provide extension of a network where reduced signal-to-noise ratio (SNR) may compromise network performance by trading off data rates for an expansion of the number of nodes and distribution lines; thereby providing more nodes/sensors, with greater interconnectivity.

Figure 2:
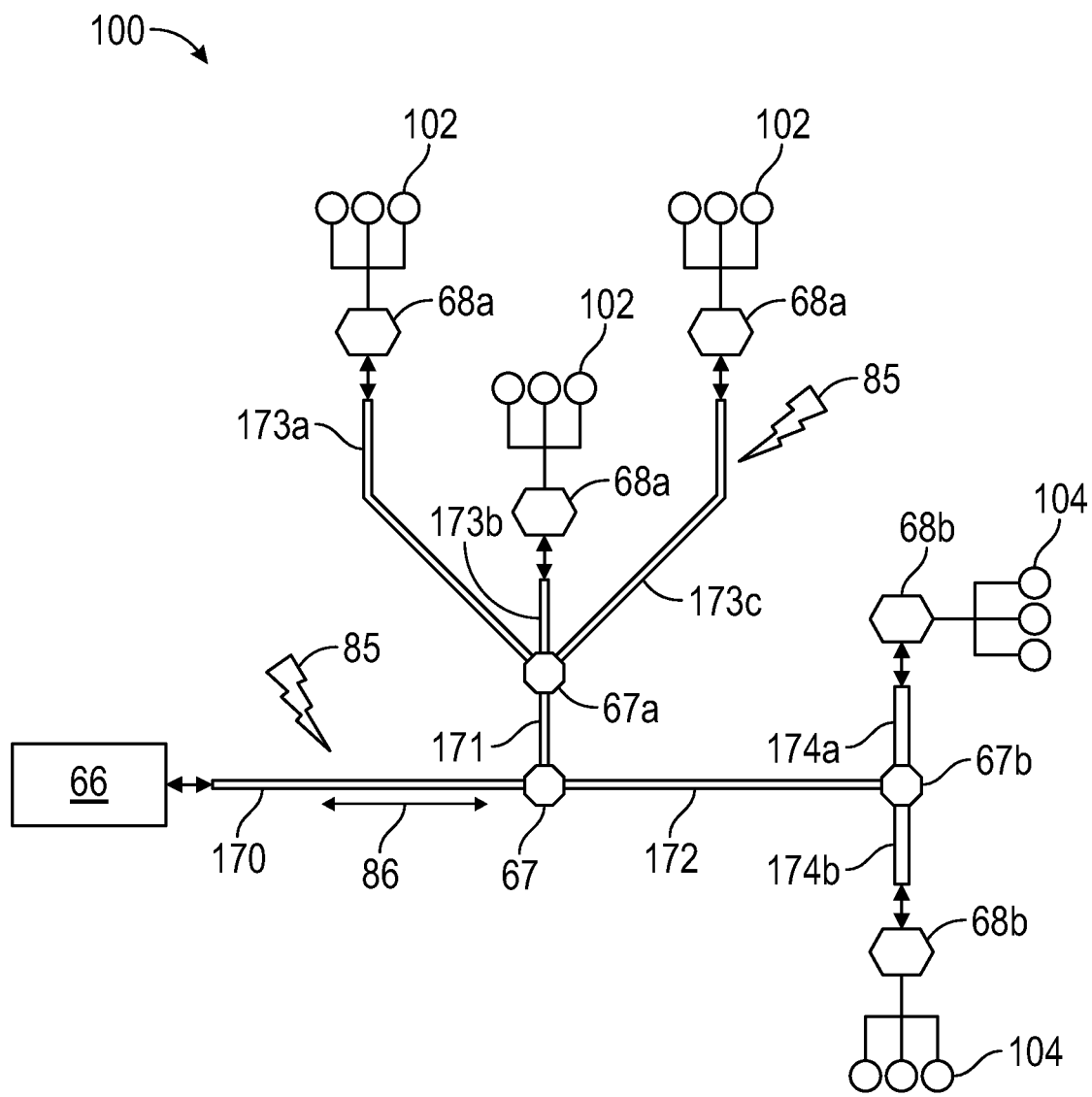
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to two nodes 68b through waveguides 174a, 174b in parallel. Each of the nodes 68b can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. A carrier frequency can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while providing additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

FIG. 3 is a schematic view of a waveguide system 200 with redundant waveguides and redundant nodes in accordance with an embodiment of the disclosure. A first node 202A and a second node 212A are configured to establish a first communication path 206A through a first waveguide 210A. A third node 202B and a fourth node 212B are configured to establish a second communication path 206B through a second waveguide 210B in a machine, such as the gas turbine engine 20 of FIG. 1. The first node 202A is grouped with the third node 202B as a first node group 204, and the second node 212A is grouped with the fourth node 212B as a second node group 214 such that the second communication path 206B provides a redundant communication path with respect to the first communication path 206A for communication between the first node group 204 and the second node group 214. The first node 202A and the third node 202B of the first node group 204 can be located in close physical proximity to each other and may be redundant elements, such as two of the same type of nodes 68a for actuators 102 or nodes 68b for sensors 104 of FIG. 2. Similarly, the second node 212A and the fourth node 212B of the second node group 214 can be located in close physical proximity to each other and may be redundant elements, such as two of the same type of nodes 68a for actuators 102 or nodes 68b for sensors 104 of FIG. 2. Further, the first node group 204 or the second node group 214 may be the controller 66, where the first node 202A and the third node 202B or the second node 212A and the fourth node 212B represent redundant control channels of the controller 66 of FIGS. 1 and 2. For instance, the first node 202A can include processing system elements, input/output, and communication interfaces that are redundant with the third node 202B such that if the first node 202A becomes unable to operate or communicate with the second node 212A, then the third node 202B can perform control and communication with respect to the fourth node 212B to maintain operation of the machine. In some embodiments, the first node 202A and the third node 202B may have a local communication channel (not depicted) that provides cross-channel communication between the first node 202A and the third node 202B. Similarly, the second node 212A and the fourth node 212B can have a local communication channel (not depicted) that provides cross-channel communication between the second node 212A and the fourth node 212B.

In the example of FIG. 3, the first waveguide 210A and the second waveguide 210B can be physically separated by a minimum separation distance 208 to reduce the risk of a single piece of debris or ballistic material damaging both the first waveguide 210A and the second waveguide 210B. The minimum separation distance 208 can be established based on routing of the first waveguide 210A and the second waveguide 210B relative to structures and components of the machine. The physical path length of the first waveguide 210A and the second waveguide 210B may be matched to maintain similar signal propagation delays through both of the first waveguide 210A and the second waveguide 210B. Although only the first node group 204 and the second node group 214 are depicted in FIG. 3, it will be understood that additional node groups can be added to the waveguide system 200, and additional nodes can be added to each node group.

FIG. 4 is a schematic view of a waveguide system 300 with redundant waveguides, a shared communication path, and redundant nodes in accordance with an embodiment of the disclosure. Similar to the waveguide system 200 of FIG. 3, the waveguide system 300 of FIG. 4 includes first node 202A and second node 212A configured to establish a first communication path 306A through a first waveguide 310A. Third node 202B and fourth node 212B are configured to establish a second communication path 306B through a second waveguide 310B in a machine, such as the gas turbine engine 20 of FIG. 1. The first node 202A is grouped with the third node 202B as first node group 204, and the second node 212A is grouped with the fourth node 212B as second node group 214 such that the second communication path 306B provides a redundant communication path with respect to the first communication path 306A for communication between the first node group 204 and the second node group 214.

In contrast to the first waveguide 210A of FIG. 3, the first waveguide 310A does not directly connect to the first node 202A and the second node 212A; rather, the first node 202A is coupled to a first waveguide subnetwork 302 that is coupled to a first shared communication path 304. The second node 212A is coupled to a second waveguide subnetwork 312 that is coupled to a second shared communication path 314. The third node 202B is also coupled to the first waveguide subnetwork 302, and the fourth node 212B is coupled to the second waveguide subnetwork 312. The first shared communication path 304 and the second shared communication path 314 each merge at least one portion of the first communication path 306A and the second communication path 306B between the first node group 204 and the second node group 214. The first shared communication path 304 and the second shared communication path 314 may represent locations where signals are routed through protected areas, such that the risk of damage at the first shared communication path 304 or the second shared communication path 314 is relatively low. Further, the first shared communication path 304 and the second shared communication path 314 may represent components, such as couplers 67, 67a, 67b of FIG. 2 that connect two or more network segments together.

Similar to the example of FIG. 3, the first waveguide 310A and the second waveguide 310B can be physically separated by a minimum separation distance 308 to reduce the risk of a single piece of debris or ballistic material damaging both the first waveguide 310A and the second waveguide 310B. The minimum separation distance 308 can be established based on routing of the first waveguide 310A and the second waveguide 310B relative to structures and components of the machine. The physical path length of the first communication path 306A and the second communication path 306B may be matched to maintain similar signal propagation delays through both of the first communication path 306A and the second communication path 306B. Although only the first node group 204 and the second node group 214 are depicted in FIG. 4, it will be understood that additional node groups can be added to the waveguide system 300, and additional nodes can be added to each node group.

FIG. 5 is a schematic view of a waveguide system 400 with a damage resistant waveguide and redundant nodes in accordance with an embodiment of the disclosure. The waveguide system 400 includes first node 202A and second node 212A configured to establish a first communication path 306A through a first waveguide 310A. Third node 202B and fourth node 212B are configured to establish a second communication path 306B through a second waveguide 310B in a machine, such as the gas turbine engine 20 of FIG. 1. The first node 202A is grouped with the third node 202B as first node group 204, and the second node 212A is grouped with the fourth node 212B as second node group 214 such that the second communication path 306B provides a redundant communication path with respect to the first communication path 306A for communication between the first node group 204 and the second node group 214. In the example of FIG. 5, the first waveguide 310A is coaxially located with the second waveguide 310B. The second waveguide 310B can be hardened to survive a ballistic impact or debris impact. For example, the second waveguide 310B may have a thicker outer casing or be coated with a material that enhances structural integrity of the second waveguide 310B as compared to the first waveguide 310A. Thus, the first waveguide 310A and the second waveguide 310B may be made of different materials or have different material thicknesses, where the second waveguide 310B provides protection to the first waveguide 310A. It will be understood that the designation of "first" and "second" is for purposes of explanation, and as such the second waveguide 310B may alternatively be coaxially located within the first waveguide 310A.

In the waveguide system 400, the first node 202A is coupled to a first waveguide stub 302A that is coupled to a first communication interface 304. The second node 212A is coupled to a second waveguide stub 312A that is coupled to a second communication interface 314. The third node 202B is coupled to a third waveguide stub 302B that is coupled to the first communication interface 304. The fourth node 212B is coupled to a fourth waveguide stub 312B that is coupled to the second communication interface 314. The first communication interface 304 and the second communication interface 314 are coupled to opposite ends of the first waveguide 310A and the second waveguide 310B. The first communication interface 304 and the second communication interface 314 can be couplers 67, 67a, 67b of FIG. 2 that connect two or more network segments together. Although only the first node group 204 and the second node group 214 are depicted in FIG. 5, it will be understood that additional node groups can be added to the waveguide system 400, and additional nodes can be added to each node group.

FIG. 6 is a schematic view of a waveguide system 500 with a debris shield protecting a waveguide and redundant nodes in accordance with an embodiment of the disclosure. Similar to FIG. 5, the waveguide system 500 includes first node 202A and second node 212A configured to establish a first communication path 406A through a waveguide 410. Third node 202B and fourth node 212B are configured to establish a second communication path 406B through waveguide 410 in a machine, such as the gas turbine engine 20 of FIG. 1. The first node 202A is grouped with the third node 202B as first node group 204, and the second node 212A is grouped with the fourth node 212B as second node group 214 such that the second communication path 406B provides a partially redundant communication path with respect to the first communication path 406A for communication between the first node group 204 and the second node group 214. In the example of FIG. 5, the first waveguide 410 is shared by both the first communication path 406A and the second communication path 406B. The waveguide 410 can be at least partially surrounded by a debris shield 411 of material configured to survive a ballistic impact. The debris shield 411 can be integrally formed at least in part within a component of the machine.

In the waveguide system 500, the first node 202A is coupled to first waveguide stub 302A that is coupled to first communication interface 304. The second node 212A is coupled to second waveguide stub 312A that is coupled to a second communication interface 314. The third node 202B is coupled to third waveguide stub 302B that is coupled to the first communication interface 304. The fourth node 212B is coupled to fourth waveguide stub 312B that is coupled to the second communication interface 314. The first communication interface 304 and the second communication interface 314 are coupled to opposite ends of the waveguide 410. Thus, the first communication path 406A can include the first waveguide stub 302A, the first communication interface 304, the waveguide 410, the second communication interface 314, and the second waveguide stub 312A. The second communication path 406B can include the third waveguide stub 302B, the first communication interface 304, the waveguide 410, the second communication interface 314, and the fourth waveguide stub 312B. The first communication interface 304 and the second communication interface 314 can be couplers 67, 67a, 67b of FIG. 2 that connect two or more network segments together. Although only the first node group 204 and the second node group 214 are depicted in FIG. 6, it will be understood that additional node groups can be added to the waveguide system 500, and additional nodes can be added to each node group.

Figure 7:
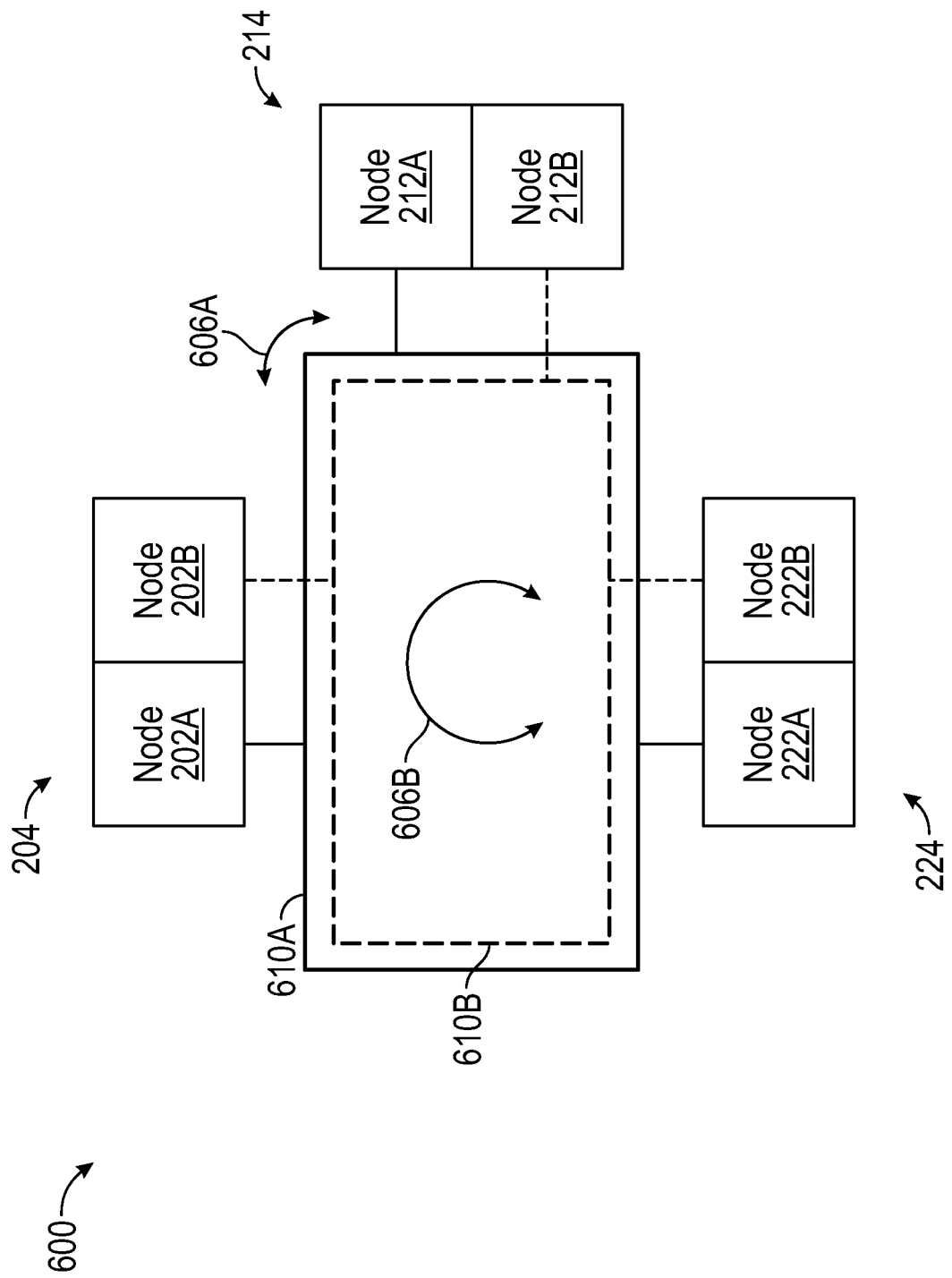
FIG. 7 is a schematic view of a waveguide system with a redundant ring topology and redundant nodes in accordance with an embodiment of the disclosure.

FIG. 7 is a schematic view of a waveguide system 600 with a redundant ring topology and redundant nodes in accordance with an embodiment of the disclosure. The waveguide system 600 includes a first communication path 606A with a first waveguide 610A in a first ring topology and a second communication path 606B with a second waveguide 610B in a second ring topology. The first communication path 606A can connect first node 202A of first node group 204, second node 212A of second node group 214, and one or more first-path nodes 222A of one or more additional node groups 224 in a communication loop. The second communication path 606B can connect third node 202B of first node group 204, fourth node 212B of second node group 214, and one or more second-path nodes 222A of one or more additional node groups 224 in a communication loop. The first waveguide 610A and the second waveguide 610B may each support bidirectional communication. Although only the three node groups are depicted in FIG. 7, it will be understood that additional node groups can be added to the waveguide system 600, and additional nodes can be added to each node group.

FIG. 8 is a schematic view of a waveguide system 700 with a redundant wired connection and redundant nodes in accordance with an embodiment of the disclosure. The waveguide system 700 includes first node 202A and second node 212A configured to establish a first communication path 706A through a waveguide 710. Third node 202B and fourth node 212B can also communicate through the first communication path 706A through waveguide 410 in a machine, such as the gas turbine engine 20 of FIG. 1. The first node 202A is grouped with the third node 202B as first node group 204, and the second node 212A is grouped with the fourth node 212B as second node group 214. In the waveguide system 700, the first node 202A is coupled to first waveguide stub 302A that is coupled to first communication interface 304. The second node 212A is coupled to second waveguide stub 312A that is coupled to a second communication interface 314. The third node 202B is coupled to third waveguide stub 302B that is coupled to the first communication interface 304. The fourth node 212B is coupled to fourth waveguide stub 312B that is coupled to the second communication interface 314. The first communication interface 304 and the second communication interface 314 are coupled to opposite ends of the waveguide 410.

To support communication system redundancy in case of damage to the waveguide 710, a wired connection 711 can be used to establish a second communication path 706B between the first node group 204 and the second node group 214. In the example of FIG. 8, the first node 202A is coupled to first communication link 702A that is coupled to first wired-communication interface 704. The second node 212A is coupled to second communication link 712A that is coupled to a second wired-communication interface 714. The third node 202B is coupled to third communication link 702B that is coupled to the first wired-communication interface 704. The fourth node 212B is coupled to a fourth communication link 712B that is coupled to the second wired-communication interface 714. The first wired-communication interface 704 and the second wired-communication interface 714 are coupled to opposite ends of the wired connection 711. Where the communication links 702A, 712A, 702B, 712B are waveguides, the first and second wired-communication interfaces 704, 714 can include radio frequency to wired communication conversion circuitry. In other embodiments, the nodes 202A, 212A, 202B, 212B can support wired communications directly on the communication links 702A, 712A, 702B, 712B, and as such, the first and second wired-communication interfaces 704, 714 may include signal conditioning and/or switching circuitry to support communication on the wired connection 711. Although only the first node group 204 and the second node group 214 are depicted in FIG. 8, it will be understood that additional node groups can be added to the waveguide system 700, and additional nodes can be added to each node group.

FIG. 9 is a schematic view of a waveguide system 800 with a redundant wireless connection and redundant nodes in accordance with an embodiment of the disclosure. The waveguide system 800 includes first node 202A and second node 212A configured to establish a first communication path 806A through a waveguide 810. Third node 202B and fourth node 212B can also communicate through the first communication path 806A through waveguide 810 in a machine, such as the gas turbine engine 20 of FIG. 1. The first node 202A is grouped with the third node 202B as first node group 204, and the second node 212A is grouped with the fourth node 212B as second node group 214. In the waveguide system 800, the first node 202A is coupled to first waveguide stub 302A that is coupled to first communication interface 304. The second node 212A is coupled to second waveguide stub 312A that is coupled to a second communication interface 314. The third node 202B is coupled to third waveguide stub 302B that is coupled to the first communication interface 304. The fourth node 212B is coupled to fourth waveguide stub 312B that is coupled to the second communication interface 314. The first communication interface 304 and the second communication interface 314 are coupled to opposite ends of the waveguide 810.

To support communication system redundancy in case of damage to the waveguide 810, one or more wireless connections 811 can be used to establish a second communication path 806B between the first node group 204 and the second node group 214. In the example of FIG. 9, the first node 202A can be configured to communication through a first wireless transceiver 802A, the second node 212A can be configured to communication through a second wireless transceiver 812A, the third node 202B can be configured to communication through a third wireless transceiver 802B, and the fourth node 212B can be configured to communication through a fourth wireless transceiver 812B. Wireless communications may be encrypted for enhance security. Further, redundancy in wireless transceiver pairs per node group can provide increased wireless system communication paths options. In some embodiments, wireless communication is reserved as a backup option when a failure of the waveguide 810 is detected. Although only the first node group 204 and the second node group 214 are depicted in FIG. 9, it will be understood that additional node groups can be added to the waveguide system 800, and additional nodes can be added to each node group.

Figure 10:
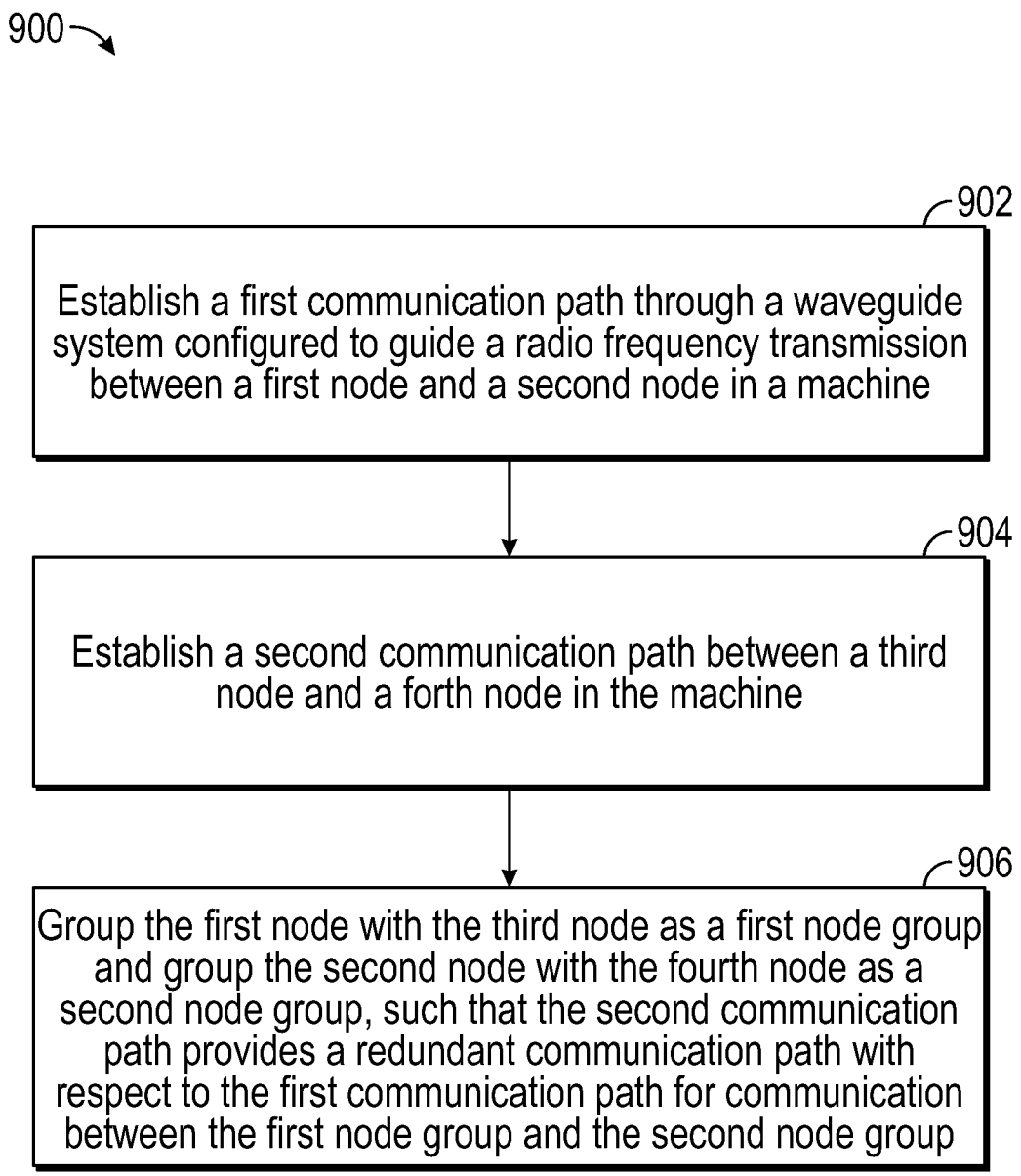
FIG. 10 is a flow chart illustrating a method in accordance with an embodiment of the disclosure.

FIG. 10 is a flow chart illustrating a method 900 of providing redundancy for a waveguide system of a machine, such as the gas turbine engine 20 of FIG. 1 in accordance with an embodiment. The method 900 of FIG. 10 is described in reference to FIGS. 1-9 and may be performed with an alternate order and include additional steps.

At block 902, a first communication path 206A, 306A, 406A, 506A, 606A, 706A, 806A can be established through a waveguide system 200, 300, 400, 500, 600, 700, 800 configured to guide a radio frequency transmission between a first node 202A and a second node 212A in a machine. Examples can include nodes 68, 68a, 68b, and the machine can be the gas turbine engine 20 of FIG. 1 or another type of machine as previously described.

At block 904, a second communication path 206B, 306B, 406B, 506B, 606B, 706B, 806B can be established between a third node 202B and a fourth node 212B in the machine.

At block 906, the first node 202A can be grouped with the third node 202B as a first node group 204. The second node 212A can be grouped with the fourth node 212B as a second node group 214, such that the second communication path 206B, 306B, 406B, 506B, 606B, 706B, 806B provides a redundant communication path with respect to the first communication path 206A, 306A, 406A, 506A, 606A, 706A, 806A for communication between the first node group 204 and the second node group 214.

The nodes 202A, 202B, 212A, 212B can be redundant embodiments of the nodes 68, 68a, 68b can be portions of a network 65 configured to communicate through a plurality of electromagnetic signals, where the nodes 68, 68a, 68b are distributed throughout the machine, such as the gas turbine engine 20. Multiple nodes 68, 68a, 68b can be used in a complete system 64 to take advantage of architecture scalability. Each of the nodes 68, 68a, 68b can be associated with at least one actuator 102 or sensor 104 of the gas turbine engine 20. For example, one or more of the nodes 68, 68a, 68b can be located at one or more of a fan section 22, a compressor section 24, a combustor section 26, and/or a turbine section 28 of the gas turbine engine 20.

In some embodiments, the first communication path 206A, 306A can include a first waveguide 210A, 310A, and the second communication path 206B, 306B can include a second waveguide 210B, 310B physically separated from the first waveguide 210A, 310A. In some embodiments, a shared communication path 304, 314 can be established that merges at least one portion of the first communication path 306A and the second communication path 306B between the first node group 204 and the second node group 214. In some embodiments, the waveguide system 500 can include a debris shield 411 of material configured to survive a ballistic impact, where the debris shield 411 may be integrally formed at least in part within a component of the machine. In some embodiments, the first node group 204, the second node group 214, and one or more additional node groups 224 can be connected in a first ring topology of the first communication path 606A; and the first node group 204, the second node group 214, and the one or more additional node groups 224 can be connected in a second ring topology of the second communication path 606B. In some embodiments, the second communication path 706B, 806B can be a wired connection 711 or a wireless connection 811.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of a machine, the system comprising:
    a first node and a second node configured to establish a first communication path through a waveguide system to guide a radio frequency transmission between the first node and the second node in the machine;
    a third node and a fourth node configured to establish a second communication path in the machine, wherein the first node is grouped with the third node as a first node group, and the second node is grouped with the fourth node as a second node group such that the second communication path provides a redundant communication path with respect to the first communication path for communication between the first node group and the second node group, wherein the first communication path comprises a first waveguide and the second communication path comprises a second waveguide physically separated from the first waveguide; and a shared communication path is configured to merge at least one portion of the first communication path and the second communication path between the first node group and the second node group, wherein the shared communication path is coupled to both the first waveguide and the second waveguide.

2. The system of claim 1, wherein the waveguide system comprises a debris shield that differs in structure, material, or thickness between the first waveguide and the second waveguide.

3. The system of claim 2, wherein the debris shield is integrally formed at least in part within a component of the machine.

4. The system of claim 1, wherein the first communication path comprises the first waveguide in a first ring topology connecting the first node group, the second node group, and one or more additional node groups; and the second communication path comprises the second waveguide in a second ring topology connecting the first node group, the second node group, and the one or more additional node groups.

5. The system of claim 1, wherein the second communication path comprises a wired connection.

6. The system of claim 1, wherein the second communication path comprises a wireless connection.

7. The system of claim 1, wherein the shared communication path comprises a first waveguide stub and a second waveguide stub coupled to a first communication interface, and the first waveguide and the second waveguide are coupled to the first communication interface, and wherein the first waveguide stub is coupled to the first node and the second waveguide stub is coupled to the second node.

8. The system of claim 7, further comprising a second shared communication path comprising a second communication interface coupled to the first waveguide and the second waveguide, wherein a third waveguide stub is coupled to the second communication interface and the third node, and wherein a fourth waveguide stub is coupled to the second communication interface and the fourth node.

9. A system for a gas turbine engine, the system comprising:

a first node and a second node configured to establish a first communication path through a waveguide system to guide a radio frequency transmission between the first node and the second node of the gas turbine engine;

a third node and a fourth node configured to establish a second communication path in the gas turbine engine, wherein the first node is grouped with the third node as a first node group, and the second node is grouped with the fourth node as a second node group such that the second communication path provides a redundant communication path with respect to the first communication path for communication between the first node group and the second node group associated with at least one sensor and/or actuator of the gas turbine engine, wherein the first communication path comprises a first waveguide and the second communication path comprises a second waveguide physically separated from the first waveguide; and a shared communication path is configured to merge at least one portion of the first communication path and the second communication path between the first node group and the second node group, wherein the shared communication path is coupled to both the first waveguide and the second waveguide.

10. The system of claim 9, wherein the waveguide system comprises a debris shield that differs in structure, material, or thickness between the first waveguide and the second waveguide, and the debris shield is integrally formed at least in part within a component of the gas turbine engine.

11. The system of claim 9, wherein the first communication path comprises the first waveguide in a first ring topology connecting the first node group, the second node group, and one or more additional node groups of the gas turbine engine; and the second communication path comprises the second waveguide in a second ring topology connecting the first node group, the second node group, and the one or more additional node groups of the gas turbine engine.

12. The system of claim 9, wherein the second communication path comprises a wired connection or a wireless connection.

13. The system of claim 9, wherein the shared communication path comprises a first waveguide stub and a second waveguide stub coupled to a first communication interface, and the first waveguide and the second waveguide are coupled to the first communication interface, and wherein the first waveguide stub is coupled to the first node and the second waveguide stub is coupled to the second node.

14. The system of claim 13, further comprising a second shared communication path comprising a second communication interface coupled to the first waveguide and the second waveguide, wherein a third waveguide stub is coupled to the second communication interface and the third node, and wherein a fourth waveguide stub is coupled to the second communication interface and the fourth node.

15. A method of providing redundancy for a waveguide system of a machine, the method comprising:

establishing a first communication path through the waveguide system configured to guide a radio frequency transmission between a first node and a second node in the machine;

establishing a second communication path between a third node and a fourth node in the machine;

grouping the first node with the third node as a first node group;

grouping the second node with the fourth node as a second node group, such that the second communication path provides a redundant communication path with respect to the first communication path for communication between the first node group and the second node group wherein the first communication path comprises a first waveguide and the second communication path comprises a second waveguide physically separated from the first waveguide; and establishing a shared communication path that merges at least one portion of the first communication path and the second communication path between the first node group and the second node group, wherein the shared communication path is coupled to both the first waveguide and the second waveguide.

16. The method of claim 15, wherein the waveguide system comprises a debris shield that differs in structure, material, or thickness between the first waveguide and the second waveguide, and further comprising:
   integrally forming the debris shield at least in part within a component of the machine.

17. The method of claim 15, further comprising:
   connecting the first node group, the second node group, and one or more additional node groups in a first ring topology of the first communication path; and
   connecting the first node group, the second node group, and the one or more additional node groups in a second ring topology of the second communication path.

18. The method of claim 15, wherein the second communication path comprises a wired connection or a wireless connection.

19. The method of claim 15, wherein the shared communication path comprises a first waveguide stub and a second waveguide stub coupled to a first communication interface, and the first waveguide and the second waveguide are coupled to the first communication interface, and wherein the first waveguide stub is coupled to the first node and the second waveguide stub is coupled to the second node.

20. The method of claim 19, further comprising establishing a second shared communication path comprising a second communication interface coupled to the first waveguide and the second waveguide, wherein a third waveguide stub is coupled to the second communication interface and the third node, and wherein a fourth waveguide stub is coupled to the second communication interface and the fourth node.

* * * * *